United States Patent
Zhang et al.

(10) Patent No.: US 11,100,442 B2
(45) Date of Patent: Aug. 24, 2021

(54) METHOD AND DEVICE FOR IMPLEMENTING SERVICE FUNCTION

(71) Applicant: Advanced New Technologies Co., Ltd., George Town (KY)

(72) Inventors: Tianyi Zhang, Hangzhou (CN); Lihui Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 30 days.

(21) Appl. No.: 15/914,657

(22) Filed: Mar. 7, 2018

(65) Prior Publication Data

US 2018/0197170 A1 Jul. 12, 2018

Related U.S. Application Data

(63) Continuation of application No. PCT/CN2016/097270, filed on Aug. 30, 2016.

(30) Foreign Application Priority Data

Sep. 8, 2015 (CN) .......................... 201510567941.8

(51) Int. Cl.
*G06Q 10/06* (2012.01)
*H04L 12/58* (2006.01)
(Continued)

(52) U.S. Cl.
CPC ..... *G06Q 10/06316* (2013.01); *G06F 3/0481* (2013.01); *G06Q 20/02* (2013.01);
(Continued)

(58) Field of Classification Search
CPC ............... G06Q 10/10; G06Q 20/3255; G06Q 10/06316
(Continued)

(56) References Cited

U.S. PATENT DOCUMENTS 8,495,047 B2 7/2013 Bookstaff
9,002,954 B2 * 4/2015 Liao .................... G06Q 10/1097
709/206
(Continued)

FOREIGN PATENT DOCUMENTS

CN 103067259 4/2013
CN 103744968 4/2014
(Continued)

OTHER PUBLICATIONS

International Search Report by the International Searching Authority issued in International Application No. PCT/CN2016/097270 dated Dec. 5, 2016; 8 pages.
(Continued)

*Primary Examiner* — Kelly S. Campen
(74) *Attorney, Agent, or Firm* — Fish & Richardson P.C.

(57) ABSTRACT

An instant message is sent from within an instant message conversation from a terminal computing device to an instant messaging server. A shortcut operation item is displayed on the terminal computing device according to an instruction received from the instant messaging server, where the shortcut operation item is associated with a service task further associated with content of the sent instant message. A predetermined execution operation associated with the shortcut operation item is received by the terminal computing device. The service task associated with the shortcut operation item is initiated by sending a request to execute the service task to the instant messaging server. An instruction is received from the instant messaging server to display an execution result of the service task, and display of the execution result of the service task is initiated on the terminal computing device.

18 Claims, 9 Drawing Sheets

(51) Int. Cl.
*G06Q 20/38* (2012.01)
*G06F 3/0481* (2013.01)
*G06Q 20/02* (2012.01)
*G06Q 20/32* (2012.01)
*H04L 29/08* (2006.01)

(52) U.S. Cl.
CPC ......... *G06Q 20/325* (2013.01); *G06Q 20/386* (2020.05); *H04L 51/02* (2013.01); *H04L 51/046* (2013.01); *H04L 67/20* (2013.01)

(58) Field of Classification Search
USPC ...... 705/7.26, 44, 7.17, 14.4, 21, 7.13, 7.11; 726/4, 3, 6, 10, 22, 5
See application file for complete search history.

(56) References Cited

U.S. PATENT DOCUMENTS

| | | | |
|---|---|---|---|
| 10,205,797 | B2* | 2/2019 | Bohannon ........... H04L 67/2861 |
| 2005/0091111 | A1 | 4/2005 | Green et al. |
| 2007/0043823 | A1 | 2/2007 | George et al. |
| 2007/0208816 | A1 | 9/2007 | Baldwin et al. |
| 2009/0122972 | A1* | 5/2009 | Kaufman ............ H04M 3/5125 379/265.12 |
| 2009/0172595 | A1* | 7/2009 | Vallone ............... G06F 3/04817 715/810 |
| 2010/0064231 | A1* | 3/2010 | Gupta .................... H04L 51/00 715/748 |
| 2010/0268597 | A1* | 10/2010 | Bookstaff .......... G06Q 30/0251 705/14.49 |
| 2010/0269174 | A1* | 10/2010 | Shelest ............. H04L 29/12066 726/22 |
| 2011/0131285 | A1* | 6/2011 | Liao ................... G06Q 10/1097 709/206 |
| 2014/0074951 | A1* | 3/2014 | Misir ................. H04L 12/1827 709/206 |
| 2014/0207679 | A1* | 7/2014 | Cho .................. G06Q 20/3229 705/44 |
| 2014/0351350 | A1 | 11/2014 | Lee et al. |
| 2014/0365914 | A1 | 12/2014 | Peng |
| 2016/0191673 | A1* | 6/2016 | Bohannon ........... H04L 67/2861 709/213 |
| 2016/0292967 | A1* | 10/2016 | Chen ................... G07F 17/3244 |
| 2016/0301638 | A1 | 10/2016 | Chen et al. |
| 2017/0074951 | A1 | 3/2017 | Li et al. |
| 2017/0329628 | A1* | 11/2017 | Zhang ..................... H04M 1/73 |
| 2019/0132222 | A1* | 5/2019 | Son ..................... H04L 41/5054 |
| 2019/0141162 | A1* | 5/2019 | Bohannon ........... H04L 67/2861 |

FOREIGN PATENT DOCUMENTS

| | | |
|---|---|---|
| CN | 104144109 | 11/2014 |
| CN | 104243273 | 12/2014 |
| CN | 104836720 | 8/2015 |
| JP | 2005167345 | 6/2005 |
| JP | 2006171799 | 6/2006 |
| JP | 2013131221 | 7/2013 |
| JP | 2015512088 | 4/2015 |
| WO | 2015109946 | 7/2015 |
| WO | WO 2015106644 | 7/2015 |
| WO | WO 2015109946 | 7/2015 |

OTHER PUBLICATIONS

PCT International Preliminary Report on Patentability in International Application No. PCT/CN2016/097270, dated Mar. 13, 2019, 10 pages (with English translation).
Extended European Search Report isssued in EP Application No. 16843579.0 dated Aug. 6, 2018; 9 pages.
Written Opinion in Singaporean Patent Application No. 11201801604S, dated Mar. 26, 2019, 6 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

US 11,100,442 B2

METHOD AND DEVICE FOR IMPLEMENTING SERVICE FUNCTION

This application is a continuation of PCT Application No. PCT/CN2016/097270, filed on Aug. 30, 2016, which claims priority to Chinese Patent Application No. 201510567941.8, filed on Sep. 8, 2015, and each application is hereby incorporated by reference in its entirety.

TECHNICAL FIELD

The present application relates to the field of network communications technologies, and in particular to a method and a device for implementing a service function.

BACKGROUND

With development of communications technologies and popularization of smart terminals, people are increasingly accustomed to completing various tasks in work and life via networks. For example, when processing a service that needs communications in advance or needs a partner to follow up afterwards, a user generally communicates with the partner by using an instant messaging system and completes the service via the network in the process of an instant conversation.

By using a transfer through a third-party payment platform as an example, in the prior art, a user usually first confirms an amount with a transfer recipient in an instant conversation, then turns on the third-party payment platform, inputs a transfer-in account and a transfer amount to complete the transfer, and then returns to the instant conversation to confirm the transfer result with the recipient. The user may have to perform multiple manual operations and manually input much content in the above process, making the process tedious and inefficient.

SUMMARY

In view of the above, the present application provides a method for implementing a service function, the method being applied on an instant messaging server and including: receiving an instant message sent by an instant conversation participant; and sending an instruction to display a shortcut operation item to a terminal of the instant conversation participant when content of the instant message in the instant conversation meets a preset trigger condition of a particular service type, the shortcut operation item being used for initiating a service task of the service type by the terminal.

The present application provides a method for implementing a service function, the method being applied on a terminal and including: sending an instant message in a participated-in instant message conversation to an instant messaging server; displaying a shortcut operation item to a user according to an instruction, received from the instant messaging server, of displaying the shortcut operation item, which corresponds to a service task associated with content of the instant message; and initiating a service task corresponding to the shortcut operation item after receiving a predetermined execution operation of the user in the shortcut operation item.

The present application further provides a device for implementing a service function, the device being applied on an instant messaging server and including: an instant message receiving unit configured to receive an instant message sent by an instant message conversation participant; and a shortcut operation instructing unit configured to send an instruction to display a shortcut operation item to a terminal of the instant conversation participant when content of the instant message in the instant conversation meets a preset trigger condition of a particular service type, the shortcut operation item being used for initiating a service task of the service type by the terminal.

The present application provides a device for implementing a service function, the device being applied on a terminal and including: an instant message sending unit configured to send an instant message in a participated-in instant message conversation to an instant messaging server; an operation item display receiving unit configured to display a shortcut operation item to a user according to an instruction, received from the instant messaging server, of displaying the shortcut operation item, which corresponds to a service task associated with content of the instant message; and an operation item initiating unit configured to initiate a service task corresponding to the shortcut operation item after receiving a predetermined execution operation of the user in the shortcut operation item.

It can be seen from the above technical solutions that, when it is determined, based on content of an instant message in an instant conversation, that a user is going to use a service of a particular type in the embodiments of the present application, a shortcut operation item corresponding to the service type can be displayed on a terminal of the user, so that the user can quickly initiate a service task of the service type. As such, manual operations and manual inputs of the user can be reduced, and efficiency of the user can be improved.

DETAILED DESCRIPTION

Embodiments of the present application provide a new method for implementing a service function. An instant messaging server can monitor contents of instant messages in an instant conversation and instruct, when judging that a user intends to perform a service of a particular service type, a terminal of the user to display a shortcut operation item corresponding to the service type. As such, the user can initiate a service task of the service type easily and conveniently by using the shortcut operation item. The user does not need to manually operate a service system of this type or manually input related information. Operations are simplified for the user, and it is more convenient for the user, such that the problems in the prior art can be solved.

In an embodiment of the present application, a user in an instant conversation can send an instant message to an instant messaging server through a terminal. The instant messaging server can forward the instant message to a terminal of another user in the same instant message conversation. A sender terminal of the instant message and the instant messaging server can access each other via a network. A receiver terminal and the instant messaging server can also access each other via a network. The terminal (the sender and/or receiver terminal) may be a device such as a mobile phone, a tablet computer, a personal computer (PC), or a notebook computer. The instant messaging server may be a physical or logical server, or two or more physical or logical servers that share different responsibilities and cooperate to implement various functions of the instant messaging server in an embodiment of the present application. In an embodiment of the present application, types of the terminal and the instant messaging server, as well as types, protocols, and the like of communication networks between the sender terminal and the instant messaging server and between the receiver terminal and the instant messaging server are not limited.

Figure 1:
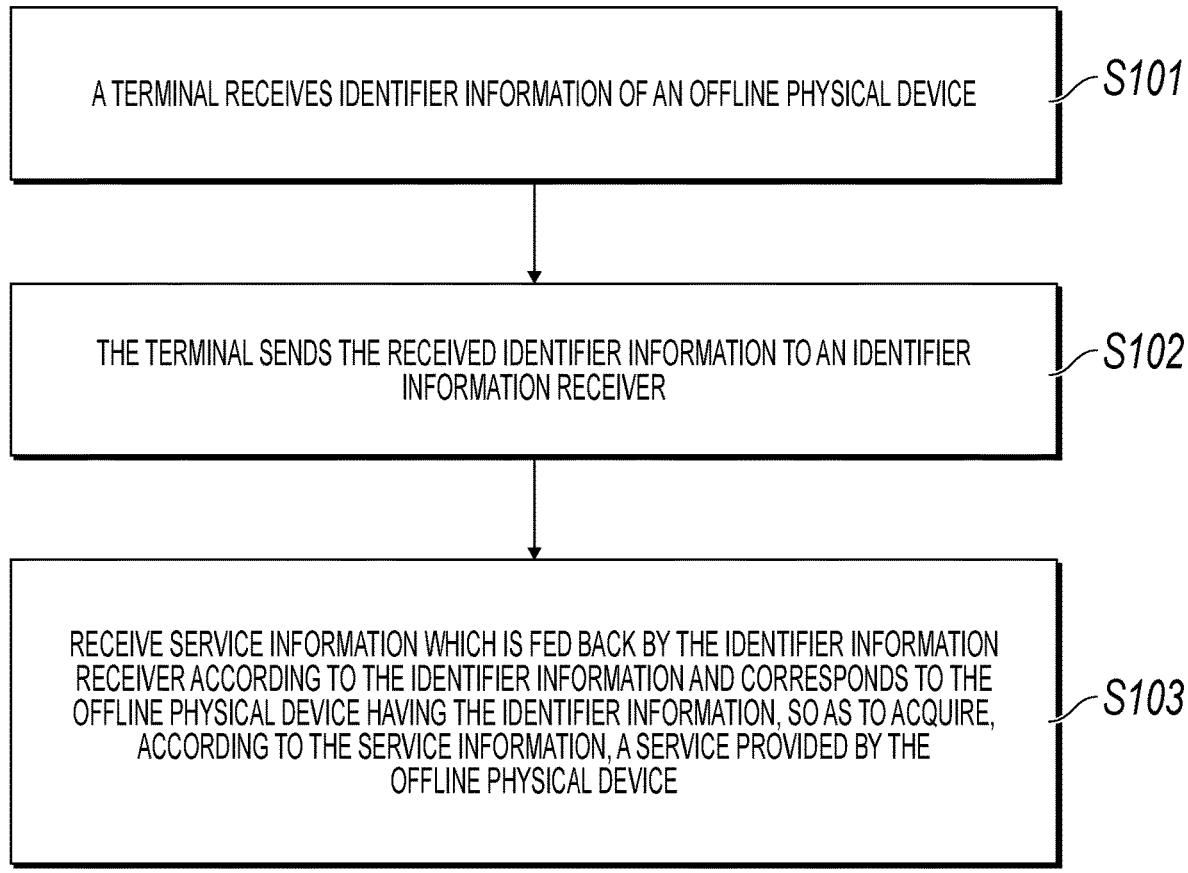
FIG. 1 is a flowchart of a method for implementing a service function applied on an instant messaging server according to an embodiment of the present application.
Figure 2:
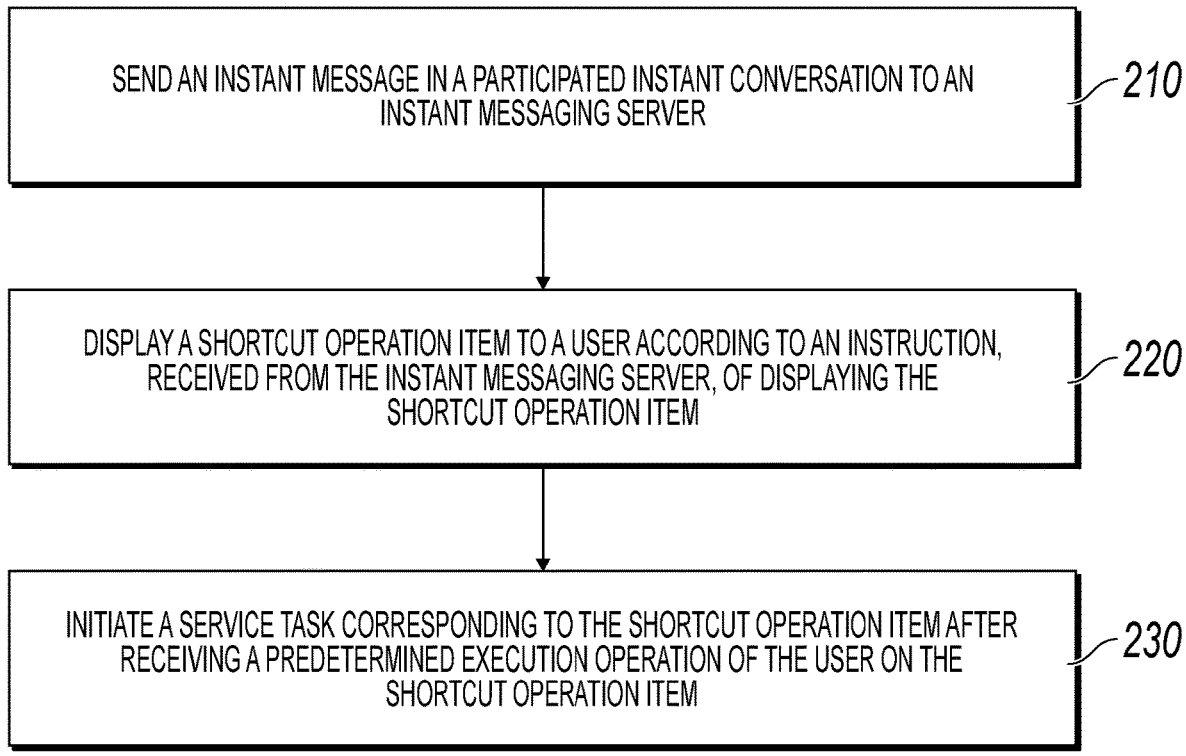
FIG. 2 is a flowchart of a method for implementing a service function applied on a terminal according to an embodiment of the present application.

In an embodiment of the present application, a procedure of the method for implementing a service function on the instant messaging server can be as shown in FIG. 1, and a procedure of the method on the terminal can be as shown in FIG. 2. On the terminal, in Step 210, an instant message in a participated-in instant message conversation is sent to the instant messaging server.

On the instant messaging server, in Step S101, an instant message sent by an instant message conversation participant is received.

A user can input an instant message to be sent in an instant message conversation to a terminal, and the terminal can send it to the instant messaging server. The instant messaging server can receive an instant message sent by each participant of the instant message conversation, and forward it to a terminal of a receiver (some of or all the participants in the instant message conversation) of the instant message. The instant message conversation may be a conversation between two or more users, or may be a group conversation.

On the instant messaging server, in Step S102, an instruction of displaying a shortcut operation item can be sent to the terminal of the instant message conversation participant when content of the instant message in the instant message conversation meets a preset trigger condition of a particular service type. The shortcut operation item is used for initiating a service task of the service type by the terminal.

On the terminal, in Step 220, a shortcut operation item can be displayed to a user according to an instruction, received from the instant messaging server, of displaying the shortcut operation item, which corresponds to the service task associated with content of the instant message.

Service functions that can be realized through the embodiments of the present application include all tasks in life and work that can be implemented via a network, such as a network payment function and a network shopping function.

Services of the same service type can be processed by the same service server, and service parameters required for implementing the services of this type are identical or similar. For example, the service type may be payment, transfer, sending a red envelope, placing an order on a shopping network, and the like. The service task may be a service of a particular service type carrying specific service parameters. The carried service parameters may be some of or all the parameters required for implementing the service of this type. For example, user A paying to merchant B is a service task carrying some service parameters.

On the instant messaging server, in Step 103, the instant messaging server can judge, according to the content of the instant message conversation, whether the user intends to initiate a service task of a particular service type. Users use significantly different vocabularies, expressions, and the like to communicate with each other about services of different types. Therefore, trigger conditions of various service types are preset in an embodiment of the present application. When content of an instant message in an instant message conversation meets the preset trigger condition of a particular service type, it can be considered that the user intends to initiate a service task of this service type. The preset trigger conditions of the service types may be stored locally in the instant messaging server, or stored at a location that the instant messaging server can access via the network.

Instant messages may include messages in the form of text, audio, video or the like. The instant messaging server can convert information delivered by a non-text instant message into a text by using various existing recognition technologies, and use the text as content of the instant message. The instant messaging server can recognize, by using various text-information analysis and processing methods, user intentions expressed in the instant messages, and determine the preset trigger condition of each service type according to the used analysis and processing methods. Each service type may have two or more predetermined trigger conditions, and can be triggered when any of them is met.

For example, the instant messaging server may use a keyword matching method to process content of an instant message. One or more terms corresponding to the service type can be used as keywords, and a preset trigger condition may be: the content of the instant message includes at least one keyword. For another example, the instant messaging server may use a semantic analysis method to process contents of several adjacent instant messages, and a preset trigger condition may be: a semantic analysis result is consistent with the corresponding service type. The instant messaging server may further integrate the above two processing methods, and use the two preset trigger conditions described above. The instant messaging server may also use other text-information processing and analysis methods in the prior art, which are not described in detail.

The instant messaging server may use content of a single instant message as an object of analysis and processing to match with a preset trigger condition. The instant messaging server may also use contents of a fixed number of adjacent instant messages or contents of adjacent instant messages, of which the number is determined based on other conditions, as an object of analysis and processing. The adjacent instant messages may be sent continuously by the same terminal, or sent continuously by all conversation participants, which are not limited in an embodiment of the present application.

When the content of the instant message meets a preset trigger condition of a particular service type, the instant messaging server can generate a service task of the service type associated with the content of the instant message, and send an instruction of displaying a shortcut operation item corresponding to the service task to the terminal of the instant message conversation participant who intends to initiate the service task.

The instant messaging server can determine, according to the analysis and processing on the content of the instant message, whether there is a user likely to use a service of a particular type. Meanwhile, the instant messaging server can determine the user who intends to use the service of this type. As such, the instant messaging server can use an account of the user as a service parameter in the generated service task. Moreover, according to the specific service type, the instant messaging server can further obtain other service parameters in the generated service task according to the content of the instant message and/or other participants of the instant message conversation. For example, an account of an opposite party of the instant message conversation can be used as another service parameter in the service task, and an amount involved in the instant message can be used as an amount of the service task. With more service parameters that can be determined by the instant messaging server, fewer items need to be input manually by the user during execution of the service task, such that efficiency can be further improved.

The instruction of displaying a shortcut operation item sent by the instant messaging server to the terminal may include an address of a server that the terminal needs to access when performing a corresponding service task, and related information of the corresponding service task. In an actual application scenario, if the terminal accesses a service server of said service type via the instant messaging server, the server address in the instruction is an address of the instant messaging server. If the terminal directly accesses the service server, the server address in the instruction is an address of the service server. The instant messaging server can add the service type of the service task and one or more generated service parameters to the instruction of displaying a shortcut operation item. As such, the terminal can display the information to the user, so that the user is clear about specific details of the service task performed by using the shortcut operation item. For example, a service parameter of the transfer service may be one or more of a transfer-out account, a transfer-in account, and a transfer amount. A service parameter of a red envelope sending service may be one or two of a red envelope sending account and a red envelope amount.

After receiving the instruction of displaying a shortcut operation item, the terminal can display a shortcut operation item to the user according to the instruction. The shortcut operation item can be displayed to the user in the form of various operable page elements, such as a clickable floating window and a system message in an instant message conversation window, which are not limited in an embodiment of the present application. The terminal can display the service type and the service parameter of the corresponding service task to the user in the shortcut operation item.

On the terminal, in Step 230, a service task corresponding to the shortcut operation item is initiated after receiving a predetermined execution operation of the user on the shortcut operation item.

The predetermined execution operation on the shortcut operation item may be clicking the displayed shortcut operation item, a predetermined touch-screen gesture, a predetermined shortcut or shortcut combination, or the like. The terminal can initiate the service task corresponding to the shortcut operation item after receiving the predetermined execution operation of the user.

If the instruction of displaying a shortcut operation item carries the address of the service server, the terminal may add the service parameter in the instruction of displaying the shortcut operation item into a request of a service task when initiating the request, to reduce items that need to be input manually.

If the instruction of displaying a shortcut operation item carries the address of the instant messaging server, the terminal can initiate a request to the instant messaging server after receiving the predetermined execution operation of the user. The instant messaging server can execute the service task corresponding to the shortcut operation item after receiving the request that is initiated by the terminal based on the shortcut operation item. The instant messaging server can send the service type and service parameters of the service task to the service server, and can further send to the terminal an instruction of displaying an execution result of the service task after receiving a processing result of the service server. The instruction carries information related to the execution result. The terminal can display the execution result to the user according to the instruction, received from the instant messaging server, of displaying the execution result of the service task. The process of executing the service task cooperatively by the instant messaging server and the service server can be implemented with reference to the prior art, and is not described in detail here.

In an implementation manner, when initiating the request by using the displayed shortcut operation, the user can further implement corresponding operations in the service according to the specific service, e.g., an operation of enabling the user to input a password, or other operations. For example, when the shortcut operation is a transfer operation, a transfer confirmation box can be generated in advance for the user to make a confirmation before the user triggers the shortcut operation to initiate a transfer request. The confirmation can be an operation of inputting a payment password. As such, the transfer operation can be effective only after the user inputs the password. For another example, if the shortcut operation is a red envelope sending operation, a red envelope confirmation box can be generated before the user triggers the shortcut operation to initiate a red envelope sending request. The confirmation box can provide other options or parameters for the user to select, e.g., a red envelope type and a red envelope quantity. Moreover, there can be operations such as inputting a password for confirmation.

In an embodiment of the present application, the shortcut operation item displayed on the terminal is a user intention estimated by the instant messaging server. The estimated user intention cannot reflect the user intention with 100% accuracy, and especially, it is not necessarily an intention that the user needs to execute right now. A display time of the shortcut operation item may be set to avoid excessive interferences to the user or even a possible error as a result of the displayed shortcut operation item. The terminal can start timing after displaying the shortcut operation item on the screen, and cancel the display of the shortcut operation item after the expiration of the display time. The display time may be preset on the terminal. Alternatively, the instant messaging server may add the display time to the instruction of displaying a shortcut operation item, and deliver the display time to the terminal.

It can be seen that, in an embodiment of the present application, the instant messaging server can monitor the content of the instant message in the instant message conversation. When a user expresses an intention of using a service of a particular type, the instant messaging server can display a shortcut operation item corresponding to the service type on a terminal of the user, such that the user can initiate a corresponding service task easily and conveniently by using the shortcut operation item. As such, manual operations and inputs required for initiating the service task can be simplified for the user, and the user can complete the service task more efficiently.

In an example of the present application, the instant messaging server can monitor the content of the instant message in the instant message conversation by using the keyword matching technology and the semantic analysis technology. Each service type can correspond to multiple preset trigger conditions. For example, a preset trigger condition of a transfer service can include: there is a keyword "transfer"; there is a keyword "transfer to", "transfer to me" or "transfer to you", and the current instant message or one or two adjacent instant messages carry a numeral.

Figure 3:
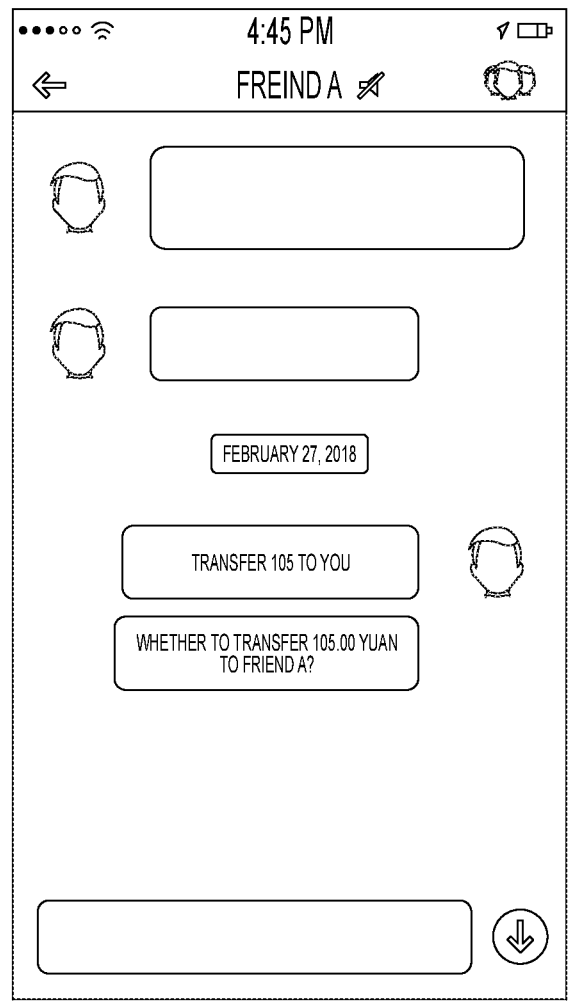
FIG. 3 shows an instant conversation interface displaying instant messages on a terminal in an application example according to the present application.

In an instant message conversation of user B with friend A (user A), user B can input an instant message "transfer 105 to you" on a terminal, and the terminal can send the instant message to the instant messaging server. An instant message conversation interface displayed on the terminal of user B can be as shown in FIG. 3.

The instant messaging server finds the keyword "transfer to you" from the instant message of user B, and finds that the instant message carries a numeral, and therefore, a preset trigger condition of the transfer service is met. The instant messaging server can perform semantic analysis on the instant message to conclude that the transfer-out account of the transfer is user B, the transfer-in account is user A, and the transfer amount is 105. The instant messaging server can generate a transfer service task of "transferring 105 from user B to user A" by using the above service parameters, generate an instruction of displaying a shortcut operation item corresponding to the transfer service task, and send the instruction to the terminal of user B. The instruction can carry the type (which is transfer) of the service task and the above three service parameters.

Figure 4:
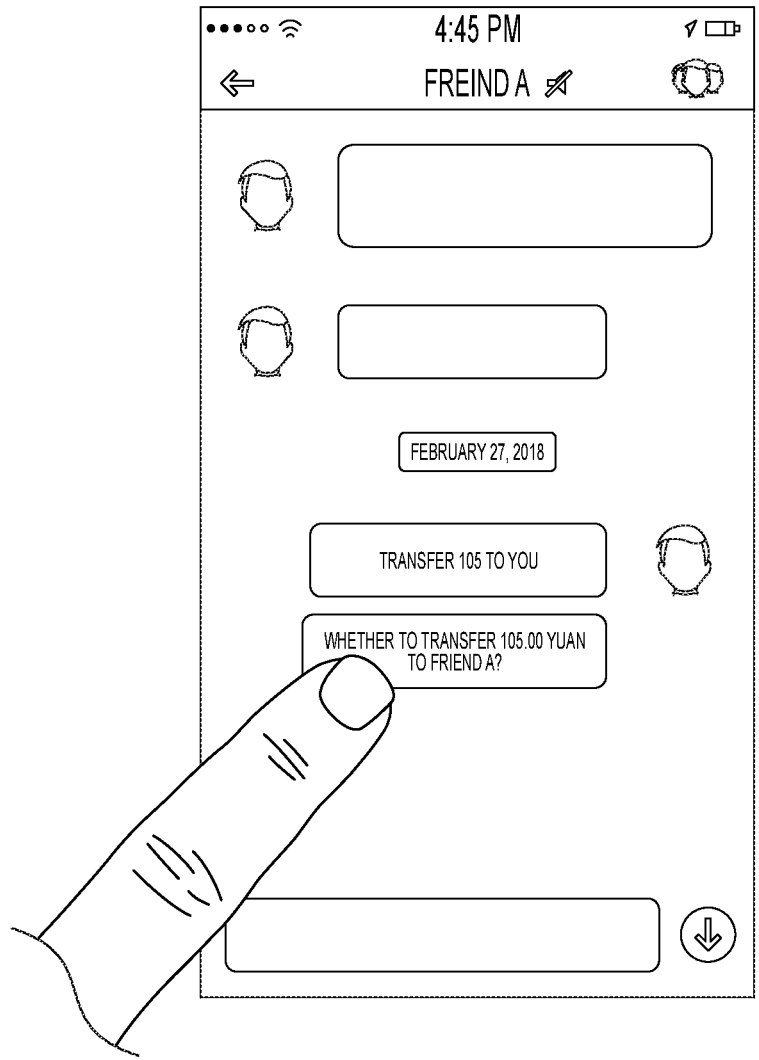
FIG. 4 shows an instant conversation interface displaying a shortcut operation item on a terminal in an application example according to the present application.

After receiving the instruction of displaying a shortcut operation item, the terminal of user B can extract the service type and the service parameters in the instruction, display a description ("Whether to transfer 105.00 yuan to friend A?" generated according to the service type and some of the service parameters) of the service task in a clickable message box on the instant message conversation interface, and start timing. The display time is 10 seconds in this application example, and is preset in instant messaging client software on the terminal. The remaining display time can be displayed after the description of the service task in the message box, as shown in FIG. 4. When the remaining display time is 0, the terminal of user B can cancel the display of the clickable message box.

When user B clicks the message box in FIG. 4, the terminal of user B can request the instant messaging server to initiate and execute the service task. The instant messaging server can initiate a transfer request to a payment server, and add the transfer-out account, the transfer-in account, and the transfer amount to the transfer request. After receiving transfer success confirmation information returned by the payment server, the instant messaging server can generate an instruction of displaying a service task execution result, and inform the terminal of user B a transfer success result by using the instruction carrying the result.

Figure 5:
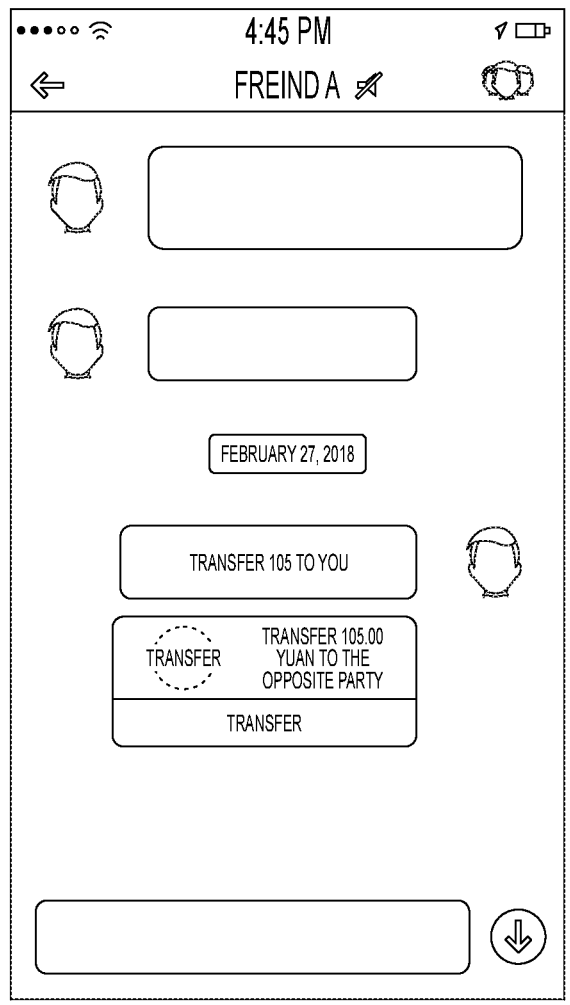
FIG. 5 shows an instant conversation interface displaying a service task execution result on a terminal in an application example according to the present application.

After receiving the instruction of displaying a service task execution result, the terminal of user B can display "transfer 105.00 yuan to the opposite party" to the user, as shown in FIG. 5.

Figure 6:
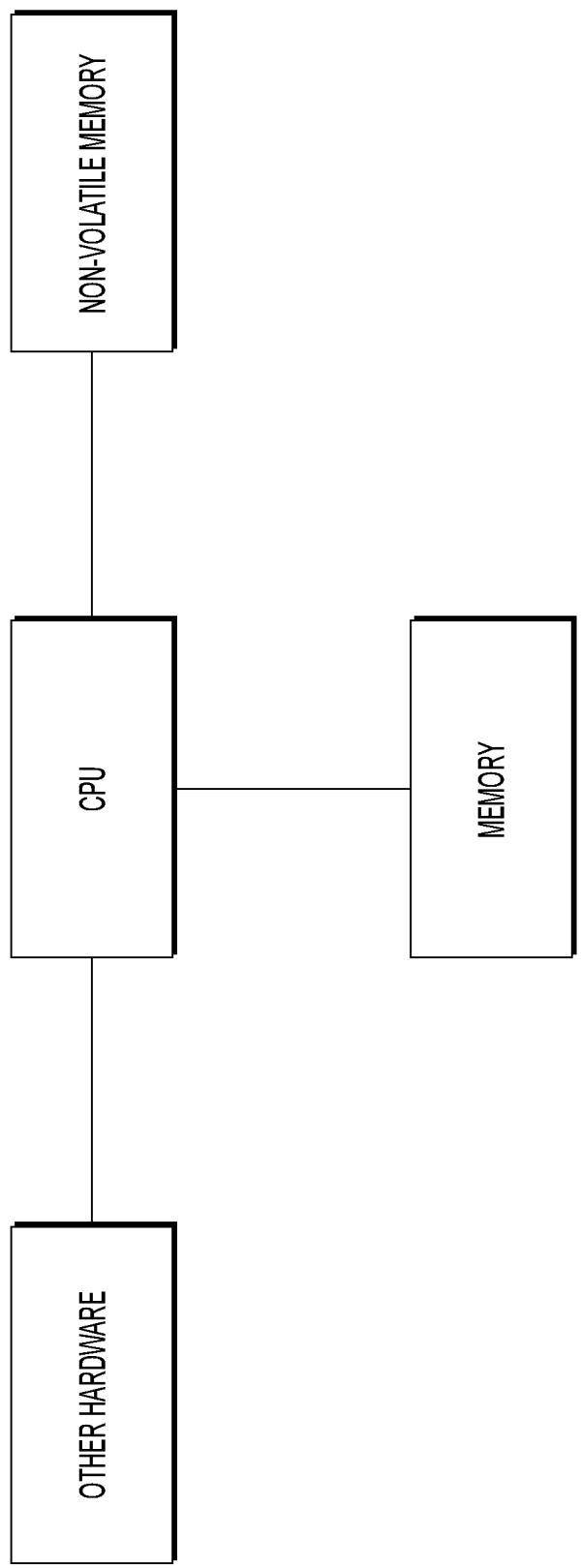
FIG. 6 is a hardware structural diagram of a terminal or a server.

Corresponding to the above procedure implementation, the embodiments of the present application further provide a device for implementing a service function and applied on an instant messaging server, and a device for implementing a service function and applied on a terminal. The two devices can both be implemented through software, and can also be implemented through hardware or a combination of software and hardware. By using software implementation as an example, as a logical device, it is formed by reading a corresponding computer program instruction into a memory through a terminal or a Central Process Unit (CPU) of a server and running the computer program instruction. From the perspective of hardware, in addition to the CPU, the memory and the non-volatile storage shown in FIG. 6, the terminal where the device for implementing a service function is located generally further includes other hardware such as a chip used for receiving and transmitting a wireless signal, and the server where the device for implementing a service function is located generally further includes other hardware such as a board card used for implementing a network communication function.

Figure 7:
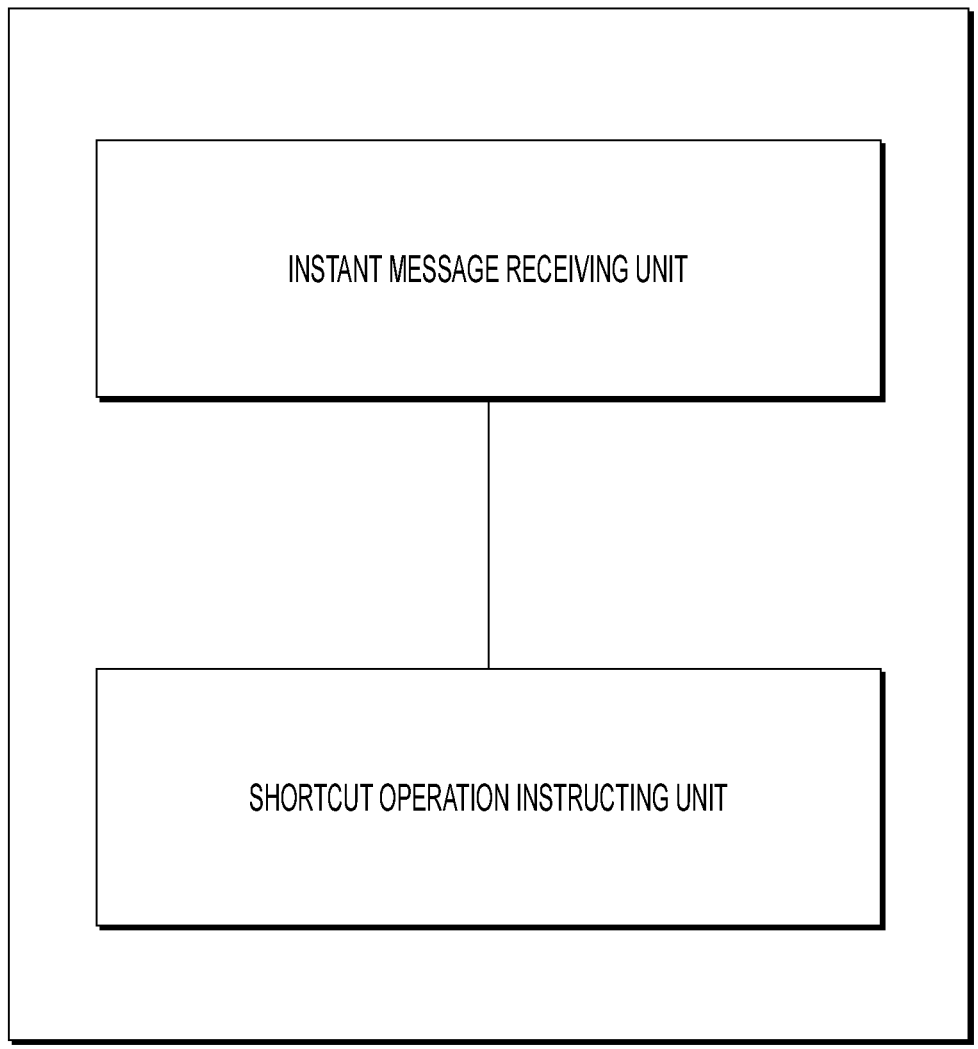
FIG. 7 is a logic structural diagram of a device for implementing a service function and applied on an instant messaging server according to an embodiment of the present application.

FIG. 7 shows a device for implementing a service function according to an embodiment. The device is applicable to the instant messaging server, and includes an instant message receiving unit and a shortcut operation instructing unit. The instant message receiving unit is configured to receive an instant message sent by an instant message conversation participant. The shortcut operation instructing unit is configured to send an instruction of displaying a shortcut operation item to a terminal of the instant message conversation participant when content of the instant message in the instant message conversation meets a preset trigger condition of a particular service type, the shortcut operation item being used for initiating a service task of the service type by the terminal.

In an example, the device can further include an operation request receiving unit configured to receive a request initiated by the terminal based on the shortcut operation item, and execute a service task corresponding to the shortcut operation item.

In the above example, the device may further include an execution result instructing unit configured to send to the terminal an instruction of displaying the execution result of the service task.

Optionally, the preset trigger condition includes: the content of the instant message includes a keyword corresponding to the service type, and/or a semantic analysis result for contents of several adjacent instant messages is consistent with the corresponding service type.

Optionally, the instruction of displaying a shortcut operation item includes a display time of the shortcut operation item on the terminal, and the display of the shortcut operation item is canceled by the terminal at the expiration of the display time.

Optionally, the instruction of displaying a shortcut operation item includes the service type and at least one service parameter of the service task; and the service parameter is generated according to contents of instant messages in the instant message conversation and/or participants of the instant message conversation.

Optionally, the service function includes a network payment function; the service type includes transfer and/or sending a red envelope; a service parameter of transfer includes one or more of a transfer-out account, a transfer-in account, and a transfer amount; and a service parameter of sending a red envelope includes one or two of a red envelope sending account and a red envelope amount.

Figure 8:
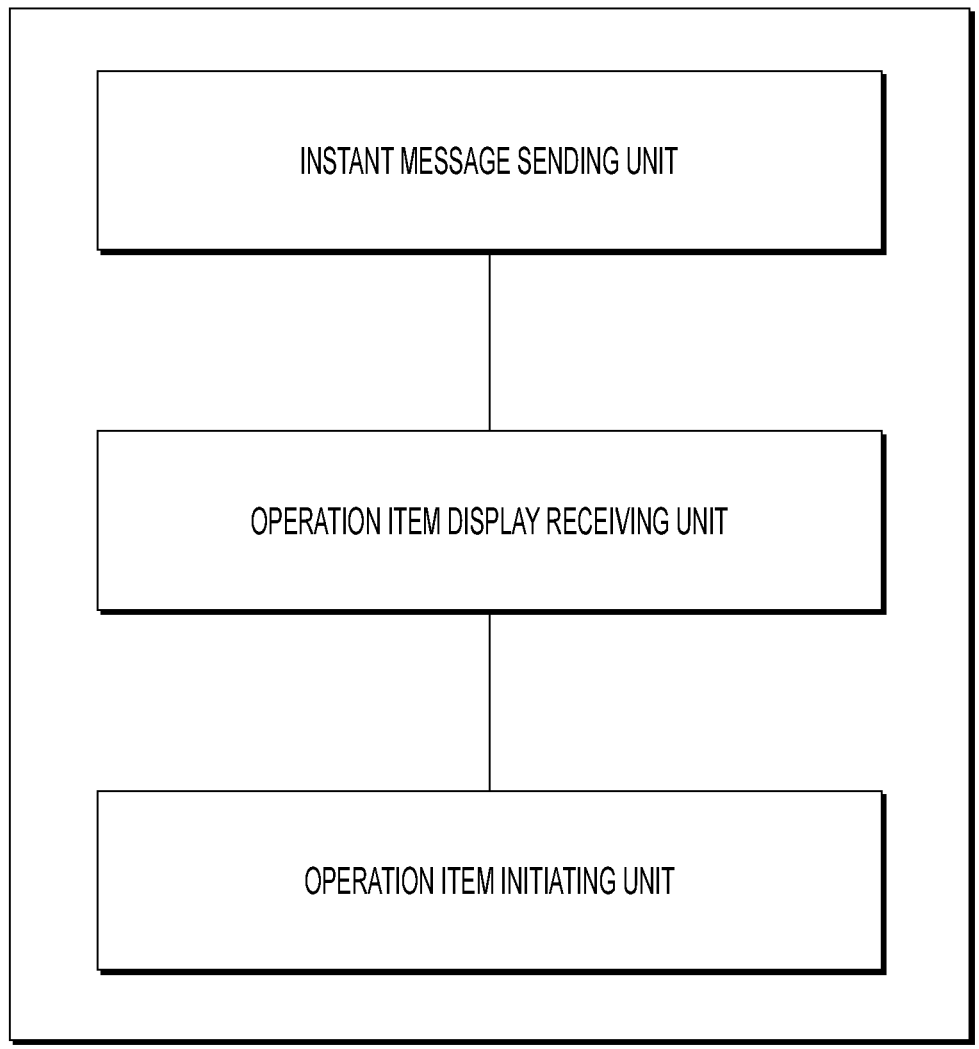
FIG. 8 is a logic structural diagram of a device for implementing a service function and applied on a terminal according to an embodiment of the present application.

FIG. 8 shows a device for implementing a service function according to this embodiment. The device is applicable to a terminal, and includes an instant message sending unit, an operation item display receiving unit, and an operation item initiating unit. The instant message sending unit is configured to send an instant message in a participated instant message conversation to an instant messaging server. The operation item display receiving unit is configured to display a shortcut operation item to a user according to an instruction, received from the instant messaging server, of displaying the shortcut operation item, which corresponds to a service task associated with content of the instant message. The operation item initiating unit is configured to initiate a service task corresponding to the shortcut operation item after receiving a predetermined execution operation of the user on the shortcut operation item.

Optionally, the device further includes an operation item display canceling unit configured to cancel the display of the shortcut operation item after the expiration of a display time of displaying the shortcut operation item to the user; the display time is preset on the terminal or is designated by the instant messaging server in the instruction of displaying the shortcut operation item.

Optionally, the operation item initiating unit is specifically configured to initiate a request to the instant messaging server based on the shortcut operation item after receiving the predetermine execution operation of the user on the shortcut operation item; and the device further includes an execution result display unit configured to display an execution result to the user according to an instruction, received from the instant messaging server, of displaying the execution result of the service task.

Optionally, the service function includes a network payment function; the service type of the service task includes transfer or sending a red envelope; a service parameter of transfer includes one or more of a transfer-out account, a transfer-in account, and a transfer amount; and a service parameter of sending a red envelope includes one or two of a red envelope sending account and a red envelope amount.

The above description is merely preferred embodiments of the present application, and are not intended to limit the present application. Any modification, equivalent replacement and improvement made without departing from the spirit and principle of the present application shall fall within the protection scope of the present application.

In a typical configuration, a computing device includes one or more processors (CPU), an input/output interface, a network interface, and a memory.

The memory may include a computer readable medium including a volatile memory, a random access memory (RAM) and/or a non-volatile memory or the like, for example, a read-only memory (ROM) or a flash RAM. The memory is an example of the computer readable medium.

The computer readable medium includes non-volatile and volatile media as well as movable and non-movable media, and can implement information storage by means of any method or technology. Information can be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition of this text, the computer readable medium does not include transitory media, such as a modulated data signal and a carrier.

It should be further noted that the term "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. In a case without any more limitations, an element defined by "including a/an . . . " does not exclude that the process, method, commodity or device including the element further has other identical elements.

Those skilled in the art should understand that the embodiments of the present application can be provided as a method, a system, or a computer program product. Therefore, the present application can be implemented as a complete hardware embodiment, a complete software embodiment, or an embodiment combining software and hardware. Moreover, the present application can be in the form of a computer program product implemented on one or more computer usable storage media (including, but not limited to, a magnetic disk memory, a CD-ROM, an optical memory and the like) including computer usable program code.

Figure 9:
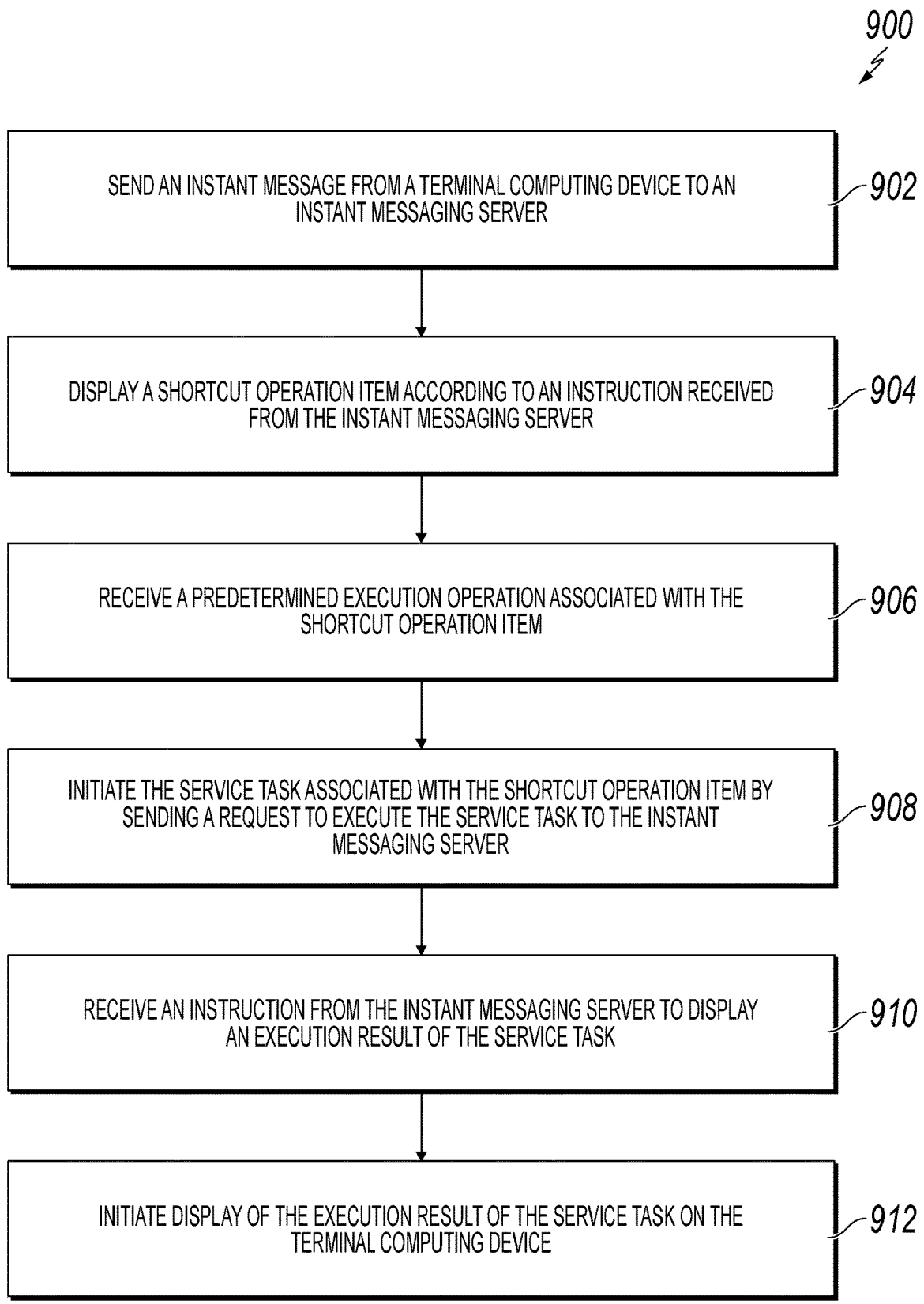
FIG. 9 is a flowchart illustrating an example of a computer-implemented method for implementing a service function applied on an instant messaging server, according to an implementation of the present disclosure.

FIG. 9 is a flowchart illustrating an example of a computer-implemented method 900 for implementing a service function applied on an instant messaging server, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, an instant message is sent from within an instant message conversation from a terminal computing device to an instant messaging server. The instant message sent by the terminal computing device is received by the instant messaging server. An instruction is sent to the terminal computing device to display a shortcut operation item when content of the received instant message meets a preset trigger condition of a service type. The shortcut operation item is configured to be used by the terminal computing device to initiate the service task. In some implementations, a displayed shortcut operation item can be positioned on the graphical user interface of the terminal computing device based on analysis of the graphical user interface, currently displayed data, user preferences, and other relevant data to determine what display position would be least obtrusive for a user (for example, to obscure the least amount of data and to avoid covering any critical or often-used graphical user interface elements).

In some implementations, the service type is associated with a network payment service function that includes transferring or sending a red envelope. A service parameter of transferring a red envelope includes one or more of a transfer-out account, a transfer-in account, and a transfer amount. A service parameter of sending a red envelope includes one or both of a red envelope sending account and a red envelope amount.

In some implementations, the preset trigger condition includes that at least one keyword corresponds to the service type or a semantic analysis result is consistent with a corresponding service type. From 902, method 900 proceeds to 904.

At 904, a shortcut operation item is displayed on the terminal computing device according to an instruction received from the instant messaging server, where the shortcut operation item is associated with a service task further associated with content of the sent instant message. From 904, method 900 proceeds to 906.

At 906, a predetermined execution operation associated with the shortcut operation item is received by the terminal computing device. From 906, method 900 proceeds to 908.

At 908, the service task associated with the shortcut operation item is initiated by sending a request to execute the service task to the instant messaging server. In some implementations, the request to execute the service task is based on the received predetermined execution operation associated with the shortcut operation item and is received by the instant messaging server. In response to the receive request, the service task is executed on the instant messaging server. An instruction is sent to the terminal computing device to display an execution result of the executed service task. From 908, method 900 proceeds to 910.

At 910, an instruction is received from the instant messaging server to display an execution result of the service task. In some implementations, the instruction received by the terminal computing device to display a shortcut operation item includes a display time for the shortcut operation item on the terminal computing device. In some instances display of the shortcut operation item is canceled by the terminal computing device upon expiration of the included display time or a preset display time associated with the terminal computing device. In some implementations, the instruction to display the shortcut operation item on the terminal computing device includes the service type and at least one service parameter associated with the service task. The at least one service parameter is generated according to content of a particular instant message in the instant message conversation or attributes of participants engaging in the instant message conversation. In some implementations, the displayed execution result of the service task can be positioned on the graphical user interface of the terminal computing device based on analysis of the graphical user interface, currently displayed data, user preferences, and other relevant data to determine what display position would be least obtrusive for a user (for example, to obscure the least amount of data and to avoid covering any critical or often-used graphical user interface elements). From 910, method 900 proceeds to 912.

At 912, display of the execution result of the service task is initiated on the terminal computing device. After 912, method 900 stops.

Implementations of the subject matter described in this specification can be implemented so as to realize particular advantages or technical effects. For example, implementations of the subject matter permit for contextually-relevant, computer-based service tasks to be recommended based on content of instant messages generated using a terminal computing device while engaging in an instant message conversation. The recommendations cause a graphical user interface of the terminal computing device to display the contextually-relevant recommendations as shortcut operation items associated with a computer-based service task. User interaction with the shortcut operation (for example, a touch or swipe interaction) item results in an initiation of the associated service task on an instant messaging server by a request generated by the terminal computing device that is sent to the instant messaging server. Following execution of the service task, the instant messaging server sends a request to the terminal computing device to display an execution result of the service task on the terminal computing device. The described methodology can ensure the efficient usage of computer resources (for example, processing cycles, network bandwidth, and memory usage), through the efficient recommendation of only contextually-relevant, computer-based service tasks. At least this action minimizes or prevents waste of available computer resources by preventing undesired recommendations from being generated. In some implementations and as previously described, a displayed shortcut operation item or the displayed execution result of the service task can be positioned on the graphical user interface of the terminal computing device based on analysis of the graphical user interface, currently displayed data, user preferences, and other relevant data to determine what display position would be least obtrusive for a user (for example, to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    sending, within an instant message conversation, an instant message from a terminal computing device to an instant messaging server;
    estimating, by the instant messaging server, a user-intent expressed in the instant message by performing a text-information analysis of a content in the instant message conversation;
    determining, by the instant messaging server based on the estimated user-intent, that a preset trigger condition of a service type is satisfied;
    responsive to determining that the preset trigger condition of the service type is satisfied, generating, by the instant messaging server, a service task of the service type;
    generating, by the instant messaging server, at least one service parameter associated with the service task, wherein the at least one service parameter is generated based on a content of a particular instant message in the instant message conversation or attributes of participants engaging in the instant message conversation;

displaying, on the terminal computing device, a shortcut operation item according to an instruction received from the instant messaging server, wherein the shortcut operation item is associated with the service task and the at least one service parameter, wherein the instruction sent to the terminal computing device to display the shortcut operation item includes a display time for the shortcut operation item on the terminal computing device;

receiving, prior to an expiry of the included display time or a preset display time associated with the terminal computing device, an operation indicative of user-interaction with the shortcut operation item;

initiating, by the terminal computing device responsive to receiving the operation indicative of the user-interaction, the service task associated with the shortcut operation item by sending a request to execute the service task to the instant messaging server;

receiving an instruction from the instant messaging server to display an execution result of the service task; and initiating display of the execution result of the service task on the terminal computing device;

determining that the included display time or the preset display time associated with the terminal computing device has expired; and in response to determining the included display time or the preset display time has expired, ceasing to display of the shortcut operation item on the terminal computing device.

2. The computer-implemented method of claim 1, wherein the service type is associated with a network payment service function that includes transferring or sending a red envelope, wherein the at least one service parameter of transferring a red envelope includes one or more of a transfer-out account, a transfer-in account, and a transfer amount, and wherein the at least one service parameter of sending a red envelope includes one or both of a red envelope sending account and a red envelope amount.

3. The computer-implemented method of claim 1, wherein the preset trigger condition includes that at least one keyword corresponds to the service type or a semantic analysis result is consistent with a corresponding service type.

4. The computer-implemented method of claim 1, further comprising:
receiving a request from the terminal computing device to execute the service task, the request based on the operation indicative of the user-interaction with the shortcut operation item;
executing the service task; and
sending an instruction to the terminal computing device to display an execution result of the executed service task.

5. The computer-implemented method of claim 1, wherein performing a text-information analysis of a content in the instant message conversation comprises performing a text-information analysis of a text content and a non-text content in the instant message conversation, wherein the non-text content is converted to corresponding text information before performing the text-information analysis.

6. The computer-implemented method of claim 1, wherein the service type have two or more preset trigger conditions, comprising: the content in the instant message conversation includes at least one keyword, or a semantic analysis result is consistent with the service type.

7. A non-transitory, computer-readable medium storing one or more instructions executable by a computer system to perform operations comprising:
sending, within an instant message conversation, an instant message from a terminal computing device to an instant messaging server;
estimating, by the instant messaging server, a user-intent expressed in the instant message by performing a text-information analysis of a content in the instant message conversation;
determining, by the instant messaging server based on the estimated user-intent, that a preset trigger condition of a service type is satisfied;
responsive to determining that the preset trigger condition of the service type is satisfied, generating, by the instant messaging server, a service task of the service type;
generating, by the instant messaging server, at least one service parameter associated with the service task, wherein the at least one service parameter is generated based on a content of a particular instant message in the instant message conversation or attributes of participants engaging in the instant message conversation;
displaying, on the terminal computing device, a shortcut operation item according to an instruction received from the instant messaging server, wherein the shortcut operation item is associated with the service task and the at least one service parameter, wherein the instruction sent to the terminal computing device to display the shortcut operation item includes a display time for the shortcut operation item on the terminal computing device;
receiving, prior to an expiry of the included display time or a preset display time associated with the terminal computing device, an operation indicative of user-interaction with the shortcut operation item;
initiating, by the terminal computing device responsive to receiving the operation indicative of the user-interaction, the service task associated with the shortcut operation item by sending a request to execute the service task to the instant messaging server;
receiving an instruction from the instant messaging server to display an execution result of the service task; and
initiating display of the execution result of the service task on the terminal computing device;
determining that the included display time or the preset display time associated with the terminal computing device has expired; and
in response to determining the included display time or the preset display time has expired, ceasing to display of the shortcut operation item on the terminal computing device.

8. The non-transitory, computer-readable medium of claim 7, wherein the service type is associated with a network payment service function that includes transferring or sending a red envelope, wherein the at least one service parameter of transferring a red envelope includes one or more of a transfer-out account, a transfer-in account, and a transfer amount, and wherein the at least one service parameter of sending a red envelope includes one or both of a red envelope sending account and a red envelope amount.

9. The non-transitory, computer-readable medium of claim 7, wherein the preset trigger condition includes that at least one keyword corresponds to the service type or a semantic analysis result is consistent with a corresponding service type.

10. The non-transitory, computer-readable medium of claim 7, further comprising one or more instructions to:
   receiving a request from the terminal computing device to execute the service task, the request based on the operation indicative of the user-interaction with the shortcut operation item;
   executing the service task; and
   sending an instruction to the terminal computing device to display an execution result of the executed service task.

11. The non-transitory, computer-readable medium of claim 7, wherein performing a text-information analysis of a content in the instant message conversation comprises performing a text-information analysis of a text content and a non-text content in the instant message conversation, wherein the non-text content is converted to corresponding text information before performing the text-information analysis.

12. The non-transitory, computer-readable medium of claim 7, wherein the service type have two or more preset trigger conditions, comprising: the content in the instant message conversation includes at least one keyword, or a semantic analysis result is consistent with the service type.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      sending, within an instant message conversation, an instant message from a terminal computing device to an instant messaging server;
      estimating, by the instant messaging server, a user-intent expressed in the instant message by performing a text-information analysis of a content in the instant message conversation;
      determining, by the instant messaging server based on the estimated user-intent, that a preset trigger condition of a service type is satisfied;
      responsive to determining that the preset trigger condition of the service type is satisfied, generating, by the instant messaging server, a service task of the service type;
      generating, by the instant messaging server, at least one service parameter associated with the service task, wherein the at least one service parameter is generated based on a content of a particular instant message in the instant message conversation or attributes of participants engaging in the instant message conversation;
      displaying, on the terminal computing device, a shortcut operation item according to an instruction received from the instant messaging server, wherein the shortcut operation item is associated with the service task and the at least one service parameter, wherein the instruction sent to the terminal computing device to display the shortcut operation item includes a display time for the shortcut operation item on the terminal computing device;
      receiving, prior to an expiry of the included display time or a preset display time associated with the terminal computing device, an operation indicative of user-interaction with the shortcut operation item;
      initiating, by the terminal computing device responsive to receiving the operation indicative of the user-interaction, the service task associated with the shortcut operation item by sending a request to execute the service task to the instant messaging server;
      receiving an instruction from the instant messaging server to display an execution result of the service task; and
      initiating display of the execution result of the service task on the terminal computing device;
      determining that the included display time or the preset display time associated with the terminal computing device has expired; and
      in response to determining the included display time or the preset display time has expired, ceasing to display of the shortcut operation item on the terminal computing device.

14. The computer-implemented system of claim 13, wherein the service type is associated with a network payment service function that includes transferring or sending a red envelope, wherein the at least one service parameter of transferring a red envelope includes one or more of a transfer-out account, a transfer-in account, and a transfer amount, and wherein the at least one service parameter of sending a red envelope includes one or both of a red envelope sending account and a red envelope amount.

15. The computer-implemented system of claim 13, wherein the preset trigger condition includes that at least one keyword corresponds to the service type or a semantic analysis result is consistent with a corresponding service type.

16. The computer-implemented system of claim 13, further comprising one or more instructions to:
   receiving a request from the terminal computing device to execute the service task, the request based on the operation indicative of the user-interaction with the shortcut operation item;
   executing the service task; and
   sending an instruction to the terminal computing device to display an execution result of the executed service task.

17. The computer-implemented system of claim 13, wherein performing a text-information analysis of a content in the instant message conversation comprises performing a text-information analysis of a text content and a non-text content in the instant message conversation, wherein the non-text content is converted to corresponding text information before performing the text-information analysis.

18. The computer-implemented system of claim 13, wherein the service type have two or more preset trigger conditions, comprising: the content in the instant message conversation includes at least one keyword, or a semantic analysis result is consistent with the service type.

* * * * *